US008718015B2

(12) United States Patent
Cheng et al.

(10) Patent No.: US 8,718,015 B2
(45) Date of Patent: May 6, 2014

(54) METHOD AND TERMINAL FOR SYNCHRONIZING SUBORDINATE CARRIER CELL

(75) Inventors: Xiang Cheng, Shenzhen (CN); Yu Zhang, Shenzhen (CN); Meifang He, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 276 days.

(21) Appl. No.: 13/390,808

(22) PCT Filed: Aug. 4, 2010

(86) PCT No.: PCT/CN2010/075691
§ 371 (c)(1),
(2), (4) Date: Feb. 16, 2012

(87) PCT Pub. No.: WO2011/020407
PCT Pub. Date: Feb. 24, 2011

(65) Prior Publication Data
US 2012/0147873 A1    Jun. 14, 2012

(30) Foreign Application Priority Data

Aug. 17, 2009    (CN) .......................... 2009 1 0166142

(51) Int. Cl.
*H04W 4/00* (2009.01)
(52) U.S. Cl.
USPC ........... 370/331; 370/329; 370/324; 370/350; 455/436; 455/449
(58) Field of Classification Search
USPC .......... 370/324, 350, 503, 507, 509; 455/449, 455/502
See application file for complete search history.

(56) References Cited

U.S. PATENT DOCUMENTS

| 2004/0185852 | A1 | 9/2004 | Son et al. |
| 2008/0070578 | A1* | 3/2008 | Flore et al. ................ 455/438 |
| 2010/0222059 | A1* | 9/2010 | Pani et al. ................. 455/436 |
| 2010/0278130 | A1* | 11/2010 | Sambhwani et al. ......... 370/329 |

FOREIGN PATENT DOCUMENTS

| CN | 1787402 | 6/2006 |
| CN | 101202586 | 6/2008 |

OTHER PUBLICATIONS

IPRP/WO for related PCT/CN2010/075691 issued on Feb. 21, 2012; and its English translation.
ISR for related PCT/CN2010/075691 mailed on Nov. 18, 2010; and its English translation.

* cited by examiner

*Primary Examiner* — Kibrom T Hailu
*Assistant Examiner* — Zewdu A Beyen
(74) *Attorney, Agent, or Firm* — Ladas & Parry, LLP

(57) ABSTRACT

Disclosed are a method and a terminal for synchronizing a subordinate carrier cell, which method comprises the following steps of: after a terminal receives an activation uplink subordinate carrier order from a service node B, the terminal, with the current time as a reference, carrying out synchronization in a cell in an activation set of the enhanced dedicated channel of the subordinate carrier under a non-service node B at a first time point after having carried out delay according to an acquired subordinate carrier activation processing offset time period. The present technical solution reduces the time delay required by synchronization and inter-cell interference and enables the cell capacity and coverage to be unaffected.

18 Claims, 5 Drawing Sheets

METHOD AND TERMINAL FOR SYNCHRONIZING SUBORDINATE CARRIER CELL

CROSS-REFERENCE TO RELATED APPLICATIONS:

This application is the U.S. Stage of International Patent Application No. PCT/CN2010/075691 filed on Aug. 4, 2010, which claims priority to Chinese Patent Application No. 200910166142.4 filed on Aug. 17, 2009 the disclosures of which are hereby incorporated by reference in their entireties.

FIELD OF THE INVENTION

The present invention relates to the communication field, and in particular to a method and a terminal for synchronizing a subordinate carrier cell.

BACKGROUND OF THE INVENTION

In currently available systems, the objective of high-speed uplink packet access technology is to improve capacity and data throughput in the uplink direction and reduce the delay in dedicated channels. The high-speed uplink packet access technology introduces a new transmission channel, an enhanced dedicated channel, which improves the implementation of the physical layer and the media access control layer, and makes the uplink data rate capable of reaching up to 5.6 MBPS theoretically. The high-speed uplink packet access technology retains the property of soft handover, and as to a terminal, there is an activation set of the enhanced dedicated channel. In the activation set of the enhanced dedicated channel, a cell received by a terminal from a node B, which is absolutely authorized to schedule, is referred to as service enhanced dedicated channel cell, and the corresponding radio link (that is, a radio link in this cell) is referred to as service enhanced dedicated channel radio link. In the activation set of the enhanced dedicated channel, a relatively authorized cell set which can be accepted and merged by the terminal is referred to as a service enhanced dedicated channel cell set, which at least includes the service enhanced dedicated channel cell. And, the corresponding radio link set (that is, a set of individual radio links in each cell) is referred to as service enhanced dedicated channel radio link set. In the activation set of the enhanced dedicated channel, a cell which does not belong to the service enhanced dedicated channel cell set is referred to as a non-service enhanced dedicated channel cell, and the corresponding radio link (that is, a radio link in this cell) is referred to as non-service enhanced dedicated channel radio link.

With the development of the technology, the dual-carrier high-speed uplink packet access technology (this technology enables the terminals to send data on two carriers with the high-speed uplink packet access technology, thus doubling the uplink data rate) is expected to be introduced into currently available systems. One of the dual carriers which includes a high-speed dedicated physical control channel, is referred to as the main carrier, and the other one thereof is referred to as the subordinate carrier. As to one terminal, each layer of carrier in the dual-carrier has its own independent enhanced dedicated channel activation set. At the layer of frequency of the subordinate carrier, in the activation set of the enhanced dedicated channel of the subordinate carrier, the node B to which the service enhanced dedicated channel radio link of the subordinate carrier belongs is referred to as service node B, and the other nodes B are referred to as non-service node B.

The service node B controls the activation and deactivation of the subordinate carrier. The service node B notifies the terminal of the activation and deactivation of the subordinate carrier via an air interface order. In the situation of subordinate carrier activation, the terminal confirms to the service node B that this air interface order is received, and carries out synchronization in individual cells of the activation set of the enhanced dedicated channel of the subordinate carrier. After having detected that the synchronization of subordinate carrier service cells by the terminal is successful, the service node B reports radio link restoration to the radio network controller.

Under such control mode of the service node B controlling the subordinate carrier activation and deactivation, there exists the problem that the terminal carries out synchronization in a cell in the activation set of the enhanced dedicated channel of subordinate carrier under non-service node B. As to this terminal, if there is only a cell for receiving and sending subordinate carrier in the terminal context of non-service node B but no cell for receiving and sending main carrier, then the non-service node B has no phase reference difference of a main/subordinate carrier physical layer obtained in the action of the terminal receiving and sending on the main carrier frequency layer. And it will cause: when the terminal carries out synchronization in a cell in the activation set of the enhanced dedicated channel of subordinate carrier under non-service node B, the non-service node B and the terminal will need bigger search windows to detect the synchronization and the synchronization time delay is increased, and the inter-cell interference is also directly increased, thus affecting cell capacity and coverage.

SUMMARY OF THE INVENTION

The present invention is proposed aiming at the problem in relevant art that when the terminal carries out synchronization in a cell in the activation set of the enhanced dedicated channel of subordinate carrier under non-service node B, the non-service node B and the terminal will need bigger search windows to detect the synchronization and the synchronization time delay is increased, and the inter-cell interference is also directly increased, thus affecting cell capacity and coverage. For this end, the main object of the present invention is to provide an improved solution for synchronizing a subordinate carrier cell so as to solve at least one of the above problems.

In order to achieve the above object, a method for synchronizing a subordinate carrier cell is provided according to one aspect of the present invention.

The method for synchronizing a subordinate carrier cell comprises the steps of: after a terminal receives an activation uplink subordinate carrier order from a service node B, the terminal, with reference to the current time, carrying out synchronization in a cell in an activation set of the enhanced dedicated channel of the subordinate carrier under a non-service node B, at a first time point after having carried out delay according to an acquired subordinate carrier activation processing offset time.

Preferably, the first time point is calculated according to the formula of: the first time point=(connection frame number+ the number of frame offsets) mod 256, wherein the connection frame number indicates the current time, the number of frame offsets indicates the subordinate carrier activation processing offset time, and mod indicates to carry out remain operation.

Preferably, the terminal acquiring the subordinate carrier activation processing offset time comprises: the terminal receiving a system message from an RNC, wherein the system message carries the subordinate carrier activation processing offset time; or when establishing, reconfiguring or adding a dual-carrier high-speed uplink packet access receiving resource, the terminal receiving the subordinate carrier activation processing offset time from the RNC.

Preferably, after having received the activation uplink subordinate carrier order from the service node B via a high-speed share control channel order and received the activation uplink subordinate carrier order, the terminal sends to the service node a confirmation message responding to the activation uplink subordinate carrier order via a dedicated physical control channel of a high-speed downlink share channel.

Preferably, the above method further comprises: the terminal taking the current time as a second time point and carrying out synchronization in a cell in an activation set of the enhanced dedicated channel of the subordinate carrier under the service node B.

Preferably, the above method further comprises: the terminal taking the current time as reference and carrying out synchronization in a cell in an activation set of the enhanced dedicated channel of the subordinate carrier under the service node B, at the first time point after having carried out delay according to the acquired subordinate carrier activation processing offset time.

Preferably, the current time is: the time when the terminal receives the uplink subordinate carrier order.

Preferably, the current time is: the time when the terminal confirms to the service node that the uplink subordinate carrier order is received.

In order to achieve the above objects, a terminal is provided according to another aspect of the present invention.

The terminal according to the present invention comprises: a receiving module adapted to receive an activation uplink subordinate carrier order from a service node B; an acquisition module adapted to acquire a subordinate carrier activation processing offset time; and a synchronization module adapted to take the current time as reference and carry out synchronization in a cell in an activation set of the enhanced dedicated channel of the subordinate carrier under a non-service node B at the first time point after having carried out delay according to the acquired subordinate carrier activation processing offset time.

Preferably, the above terminal further comprises: a calculation module adapted to calculate the first time point according to the formula of: the first time point=(connection frame number+the number of frame offsets)mod 256, wherein the connection frame number indicates the current time, the number of frame offsets indicates the subordinate carrier activation processing offset time, and mod indicates to carry out remain operation.

The present invention employs the method of the terminal carrying out synchronization in the cells of the activation set of the enhanced dedicated channel of subordinate carrier under a non-service node B at the time point after delaying the subordinate carrier activation processing offset time period, so as to solve the problem in relevant art that when the terminal carries out synchronization in a cell of the activation set of the enhanced dedicated channel of subordinate carrier under a non-service node B, the non-service node B and the terminal will need to detect the synchronization with bigger search windows, which causes that the synchronization time delay is increased, the inter-cell interference is directly increased, and the cell capacity and coverage are affected. It further reduces the time delay required by synchronization, reduces the inter-cell interference brought about during this period, and enables the cell capacity and coverage to be unaffected.

BRIEF DESCRIPTION OF THE DRAWINGS

The drawings illustrated here provide a further understanding of the present invention and form a part of the present application. The exemplary embodiments and the description thereof are used to explain the present invention without unduly limiting the scope of the present invention.

In the drawings.

DETAILED DESCRIPTION OF EMBODIMENTS

Figure 1:
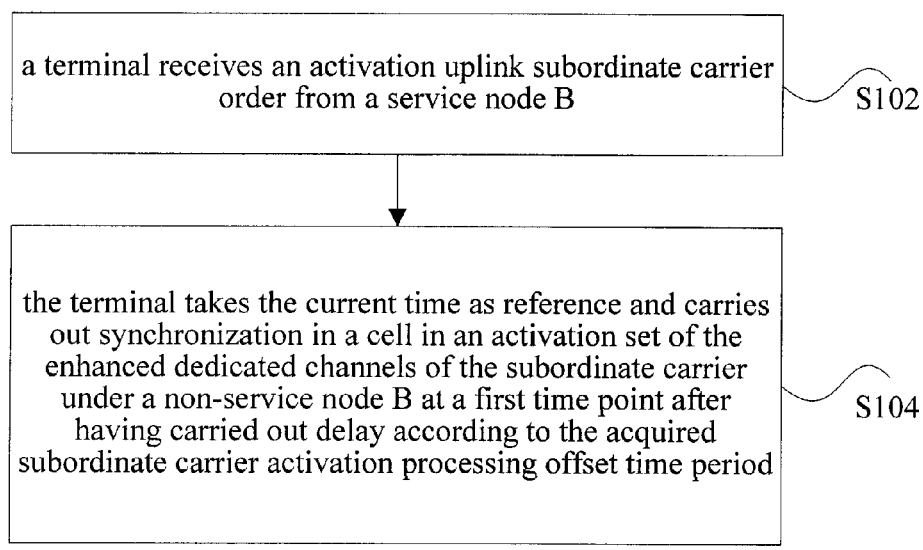
FIG. 1 is a flow chart of a method for synchronizing a subordinate carrier cell according to the embodiments of the present invention.

It needs to be noted that the embodiments of the present application and the features in the embodiments can be combined with each other if there is no conflict. The present invention is described in detail hereinafter with reference to the accompanying drawings and in combination with the embodiments.

In the following embodiments, the steps shown in the flow charts of the drawings can be executed in a computer system such as a set of computer executable instructions. And, although the logical order is shown in the flow charts, in some cases, the steps shown or described can be carried out in a different order.

In order to better describe the following embodiments, before the detailed description, the technical terms involved in the following embodiments will be described in detail.

Connection Frame Number (Counter) (abbreviated as CFN):

The connection frame number provides a common frame reference which can be used by the layer 2 between a universal mobile telecommunications system terrestrial radio access network (including a node B and a radio network controller) and a terminal. Essentially, the connection frame number is a counter of frames for transmitting channel synchronization over the layer 2 between the universal mobile telecommunications system terrestrial radio access network (including a node B and a radio network controller) and the terminal. A piece of transmission data has the same connection frame number at the receiving and sending ends of the air interface. The connection frame number is not transmitted over the air interface. The system frame number (counter) (abbreviated as SFN) of each cell is transmitted over the broadcast channel of the cell, and at both ends of the air interface, the connection frame numbers at both ends can be maintained consistent with one another via the mapping relationship between the connection frame number and system frame number. The value range of the connection frame number is between 0 frame and 255 frames, and it cycles with a period of 256 frames repetitively. In the current radio access technology, the length of one frame is 10 ms.

Dedicated Physical Control Channel for High-Speed Downlink Share Channel (Abbreviated as HS-DPCCH):

The dedicated physical control channel of the high-speed downlink share channel bears the uplink feedback information of the high-speed downlink share channel. The uplink feedback information includes: confirmation or non-confirmation information which notifies the node B whether this data packet is correctly received or not; and channel quality information (abbreviated as CQI) which notifies the node B of the data rate which the terminal is expected to receive at a given time point.

High-Speed Share Control Channel (Abbreviated as HS-SCCH):

The high-speed share control channel is a downlink channel which bears the control information of the dedicated physical data channel of the high-speed downlink share channel. This information includes channel code set, modulation solution, transmission block size, processing number of fast mix automatic retransmission, redundancy and constellation version parameter, new data mark and terminal identifier, and high-speed share control channel order (HS-SCCH ORDER).

This embodiment takes into consideration the following problem in relevant art: when the terminal carries out synchronization in a cell of the activation set of the enhanced dedicated channel of subordinate carrier under non-service node B, the non-service node B and terminal will need to detect the synchronization with bigger search windows, and it causes that the synchronization time delay is increased, the inter-cell interference is directly increased, and the cell capacity and coverage are affected. And, this embodiment provides a solution for synchronizing a subordinate carrier cell, that is, provides a solution for a terminal to carry out synchronize in individual cells of the activation set of the enhanced dedicated channel of the subordinate carrier during the subordinate carrier activation in the dual-carrier high-speed uplink packet access technology, in which the terminal carries out synchronization in a cell of the activation set of the enhanced dedicated channel of subordinate carrier under a non-service node B at the time point after delaying the subordinate carrier activation processing offset time period, so as to solve the problem that the non-service node B and the terminal will need to detect the synchronization with bigger search windows, causing the problems that the synchronization time delay is increased, the inter-cell interference is directly increased, and the cell capacity and coverage are affected.

FIG. 1 is a flow chart of a method for synchronizing a subordinate carrier cell according to the embodiments of the present invention, and as shown in FIG. 1, this procedure comprises the steps of S102 to S104.

Step S102: a terminal receives an order for activating the uplink subordinate carrier (an activation uplink subordinate carrier order) from a service node B. That is, the terminal receives an activation uplink subordinate carrier order from a service node B. This step can further comprise that the terminal confirms to the service node B that the order is received.

Step S104: the terminal takes the current time as the reference, and carries out synchronization on the cells in an activation set of the enhanced dedicated channel of the subordinate carrier under a non-service node B, at the first time point after having carried out delay according to the acquired subordinate carrier activation processing offset time period. That is, the terminal takes the current time as the reference and carries out synchronization in a cell in an activation set of the enhanced dedicated channel of the subordinate carrier under the non-service node B at the time point after having delayed the subordinate carrier activation processing offset time period.

It needs to be noted that different nodes B can have the same subordinate carrier activation processing offset time period; different nodes B can have different subordinate carrier activation processing offset time period; and different cells in the activation set of the enhanced dedicated channel of the subordinate carrier can have different subordinate carrier activation processing offset time period.

Preferably, the first time point can be calculated according to the formula: the first time point=(connection frame number+the number of frame offsets)mod 256, wherein the connection frame number indicates the current time, the number of frame offsets indicates the subordinate carrier activation processing offset time period, and 'mod' indicates the complementation operation. That is, the subordinate carrier activation processing offset time period can be represented by the number of frame offsets, and the current time can be represented using the connection frame number. Then, taking the current time as reference, at the time point after the delay of the subordinate carrier activation processing offset time period, the formula of calculating the time point is: this time point=(connection frame number+the number of frame offsets)mod 256.

Preferably, the mode of the terminal obtaining the subordinate carrier activation processing offset time period in advance can be: it is notified by the RNC via a system message, or it can also be notified by the RNC when establishing or reconfiguring or adding a dual-carrier high-speed uplink packet access resource. That is, the terminal can use the following two modes to acquire the subordinate carrier activation processing offset time period.

Mode I: the terminal receives a system message from an RNC, wherein the system message carries the subordinate carrier activation processing offset time period.

Mode II: when establishing, reconfiguring or adding a dual-carrier high-speed uplink packet access receiving resource, the terminal receives the subordinate carrier activation processing offset time period from the RNC.

The terminal can receive the activation uplink subordinate carrier order from the service node B via a high-speed share control channel order. After it received the activation uplink subordinate carrier order, the terminal sends to the service node a confirmation message responding to the activation uplink subordinate carrier order via a dedicated physical control channel of the high-speed downlink share channel.

The terminal can also carry out synchronization in the cell of the activation set of the enhanced dedicated channel of the subordinate carrier under the service node B. For example, the terminal can take the current time as the second time point, and carry out synchronization in the cell of the activation set of the enhanced dedicated channel of the subordinate carrier under the service node B; or, the terminal can also take the current time as reference, and carry out synchronization in the cell of the activation set of the enhanced dedicated channel of the subordinate carrier under the service node B at the first time point after having carried out delaying according to the acquired subordinate carrier activation processing offset time period. That is, the terminal can take the current time as a time point and carries out synchronization in the cell of the activation set of the enhanced dedicated channel of the subordinate carrier under the service node B; and can also take the current time as the reference, and carry out synchronization in the cell of the activation set of the enhanced dedicated channel of the subordinate carrier under the service node B at the time point after delaying the subordinate carrier activation processing offset time period.

There are two methods for acquiring the above current time, but it is not limited to these two methods.

The first method: the current time is the time when the terminal receives an uplink subordinate carrier order. And the second method: the current time is the time when the terminal confirms to the service node that the uplink subordinate carrier order is received.

Figure 2:
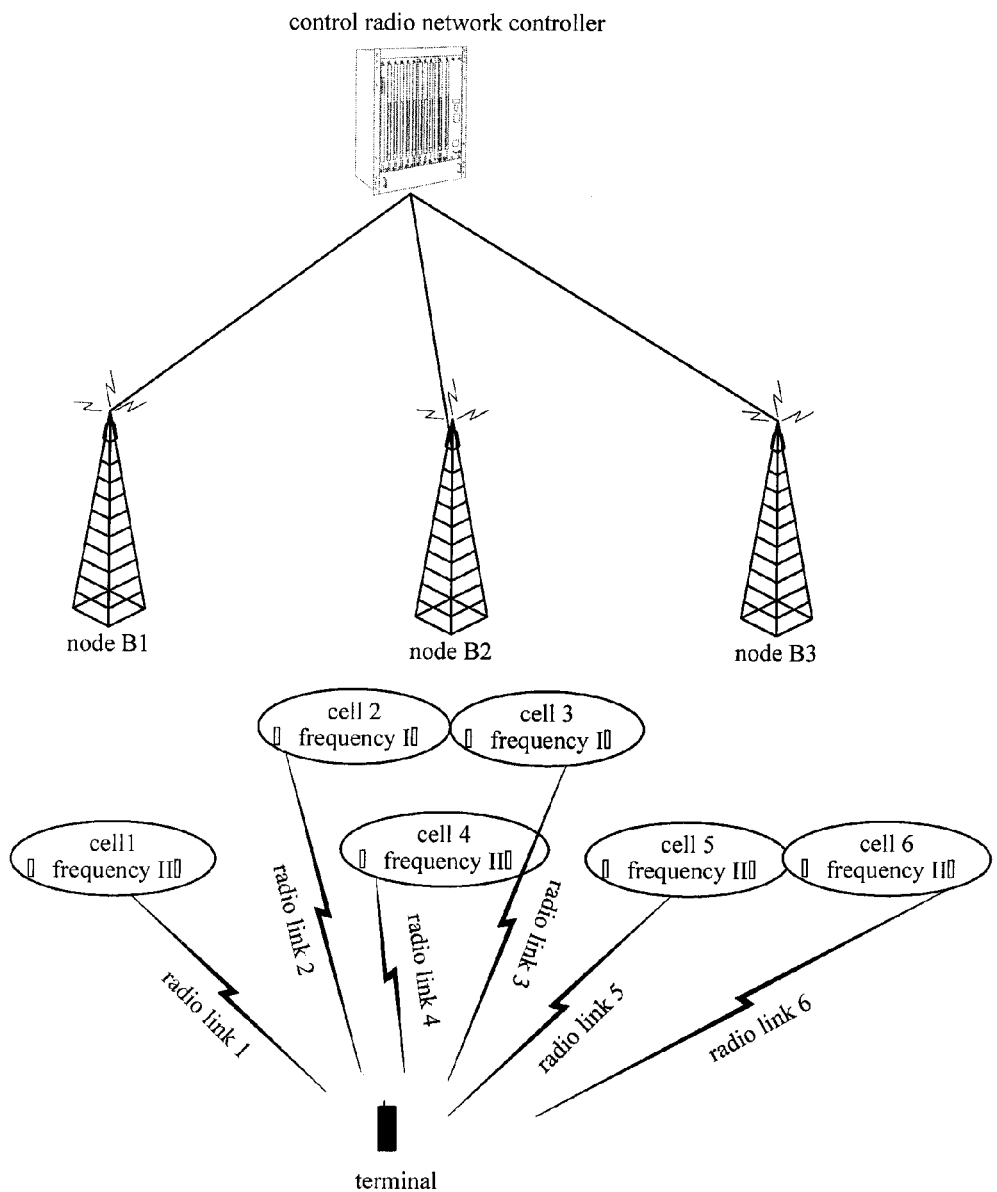
FIG. 2 is a schematic diagram of an application scenario according to the embodiments of the present invention.

FIG. 2 is a schematic diagram of an application scenario according to the embodiments of the present invention. In the application scenario of FIG. 2, the high-speed uplink packet access technology is used to transfer data over dual-carrier. The main carrier frequency in the dual-carrier is marked as frequency I, and the subordinate carrier frequency is marked as frequency II.

The activation set of the enhanced dedicated channel of the terminal is as follows.

Over the main carrier frequency, that is, over frequency I, there is a radio link between the terminal and a cell 2 of a node B2, and the radio link identifier is 2; and there is a radio link between the terminal and a cell 3 of the node B2, and the radio link identifier is 3. In this case, the radio link with the radio link identifier 2 is a "main service enhanced dedicated channel radio link"; and the node B2 is the service node B.

Over the subordinate carrier frequency, that is, over frequency II, there is a radio link between the terminal and a cell 1 of a node B1, and the radio link identifier is 1; and there is a radio link between the terminal and a cell 4 of the node B2, and the radio link identifier is 4; there is a radio link between the terminal and a cell 5 of a node B3, and the radio link identifier is 5; and there is a radio link between the terminal and a cell 6 of the node B3, and the radio link identifier is 6. In this case, the radio link with the radio link identifier 4 is a "subordinate service enhanced dedicated channel radio link"; the node B2 is the service node B; and nodes B1 and B2 are non-service nodes B.

The radio network controller (abbreviated as RNC) is connected to node B1, node B2, and node B3 via an IUB interface.

The following embodiments are based on the scenario in FIG. 2.

Embodiment I

Figure 3:
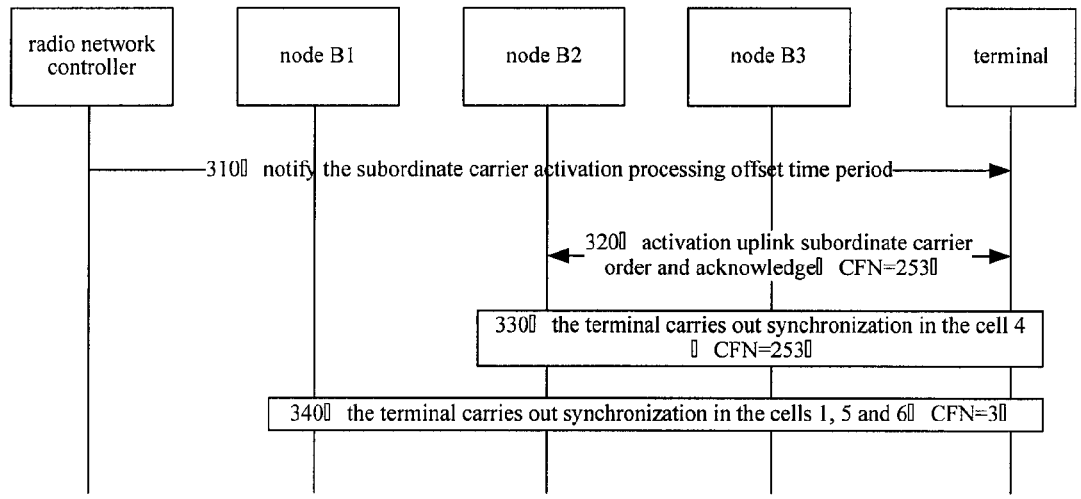
FIG. 3 is a schematic diagram of the processing procedure according to embodiment I of the present invention.

FIG. 3 is a schematic diagram of the processing procedure according to embodiment I of the present invention. As shown in FIG. 3, embodiment I provides a method for a terminal to carry out synchronization on individual cells of the activation set of the enhanced dedicated channel of the subordinate carrier during the subordinate carrier activation in the dual-carrier high-speed uplink packet access technology, that is, a method for a terminal to carry out synchronization in a cell of the activation set of the enhanced dedicated channel of subordinate carrier under a non-service node B at the time point after the delay of the subordinate carrier activation processing offset time period.

In this case, the mode of the terminal obtaining the subordinate carrier activation processing offset time period in advance is: it is notified by the RNC via a system message; and different nodes B have the same subordinate carrier activation processing offset time period. The current time is the time when the terminal receives an uplink subordinate carrier order from the service node B. The terminal takes the current time as the reference, and carries out synchronization in the cell of the activation set of the enhanced dedicated channel of the subordinate carrier under the service node B.

Step 310: in advance, the terminal is notified by the RNC of the subordinate carrier activation processing offset time period via a system message. Nodes B1 and B3 have the same subordinate carrier activation processing offset time period, and the subordinate carrier activation processing offset time period is represented by the number of frame offsets, which in particular is 6 frames, that is, 60 ms of subordinate carrier activation processing offset time period.

Step 320: the terminal receives an activation uplink subordinate carrier order from the service node B2, and the terminal confirms to the service node B2 that the order is received. In this case, the terminal receives the activation uplink subordinate carrier order from the service node B2 in the mode of a high-speed share control channel order (HS-SCCH ORDER); and the terminal makes the confirmation to the service node B2 in the mode of the dedicated physical control channel of the high-speed downlink share channel (HS-DPCCH) carrying the acknowledge information. The time that the terminal receives the activation uplink subordinate carrier order from the service node B2 is the current time, which is represented by the connection frame number and in particular is 253 frames.

Step 330: at the current time, that is, the time point when the connection frame number is 253 frames, the terminal carries out synchronization in the cell 4 of the activation set of the enhanced dedicated channel of the subordinate carrier under the service node B2.

Step 340: at the current time, that is, the time point when the connection frame number is 253 frame, the time point that the subordinate carrier activation processing offset time period is delayed for 6 frames, that is to say (connection frame number+the number of frame offsets)mod 256=(253+6)mod 256=3, in other words, the time point when the next coming connection frame number is 3, the terminal carries out synchronization in the cell 1 of the activation set of the enhanced dedicated channel of the subordinate carrier under the non-service node B1, and the terminal carries out synchronization in the cells 5 and 6 of the activation set of the enhanced dedicated channel of the subordinate carrier under the non-service node B3.

Embodiment II

Figure 4:
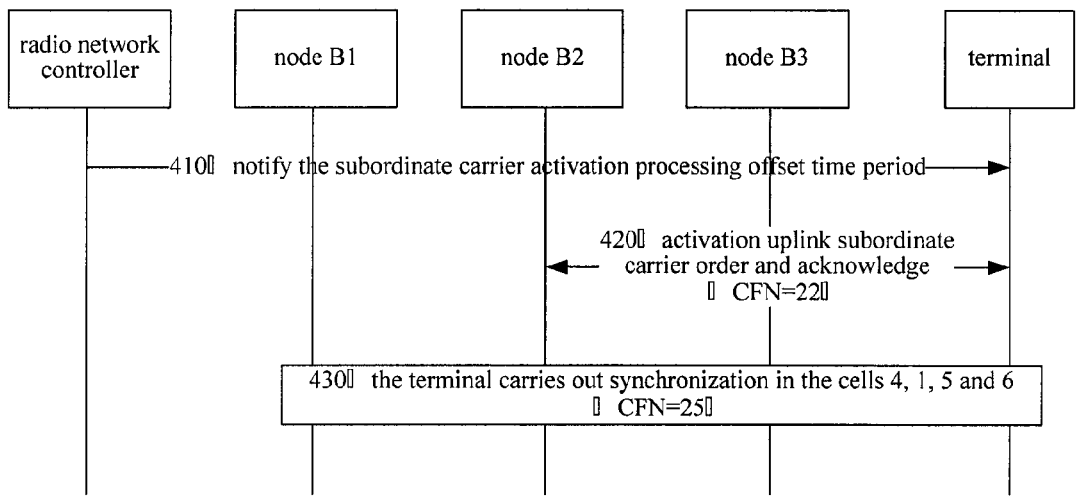
FIG. 4 is a schematic diagram of the processing procedure according to embodiment II of the present invention.

FIG. 4 is a schematic diagram of the processing procedure according to embodiment II of the present invention. And, as shown in FIG. 4, this embodiment provides a method for a terminal to carry out synchronization in individual cells of the activation set of the enhanced dedicated channel of the subordinate carrier during the subordinate carrier activation in the dual-carrier high-speed uplink packet access technology, that is, a method for a terminal to carry out synchronization in a cell of the activation set of the enhanced dedicated channel of the subordinate carrier under a non-service node B at the time point after the delay of the subordinate carrier activation processing offset time period.

In this case, the mode of the terminal obtaining the subordinate carrier activation processing offset time period in advance is: it is notified by the RNC when establishing or reconfiguring or adding a dual-carrier high-speed uplink packet access resource; and different nodes B have the same subordinate carrier activation processing offset time period. The current time is the time when the terminal receives an activation uplink subordinate carrier order from the service node B. The terminal takes the current time as the reference, and carries out synchronization in a cell of the activation set of the enhanced dedicated channel of the subordinate carrier under the service node B at the time point after the delay of the subordinate carrier activation processing offset time period.

Step 410: in advance, the terminal is notified by the RNC of the subordinate carrier activation processing offset time period when establishing or reconfiguring or adding a dual-carrier high-speed uplink packet access resource. The service node B2 and non-service nodes B1 and B3 all have the same subordinate carrier activation processing offset time period, and the subordinate carrier activation processing offset time period is represented by the number of frame offsets, which in particular is 3 frames, that is, 30 ms of subordinate carrier activation processing offset time period.

Step 420: the terminal receives an activation uplink subordinate carrier order from the service node B2, and the terminal confirms to the service node B2 that the order is received. In this case, the terminal receives the activation uplink subordinate carrier order from the service node B2 in the mode of a high-speed share control channel order (HS-SCCH ORDER). And the terminal makes the confirmation to the service node B2 in the mode of the dedicated physical control channel of the high-speed downlink share channel (HS-DPCCH) carrying the conformation information. The time that the terminal receives the uplink subordinate carrier order from the service node B2 is the current time, which is represented by the connection frame number and in particular is 22 frames.

Step 430: at the current time, that is, the time point when the connection frame number is 22 frame, the time point that the subordinate carrier activation processing offset time period is delayed for 3 frames, that is: (connection frame number+the number of frame offsets)mod 256=(22+3)mod 256=25, in other words, the time point when the next coming connection frame number is 25, the terminal carries out synchronization in the cell 4 of the activation set of the enhanced dedicated channel of the subordinate carrier under the service node B2, the terminal carries out synchronization in the cell 1 of the activation set of the enhanced dedicated channel of the subordinate carrier under the non-service node B1, and the terminal carries out synchronization in the cells 5 and 6 of the activation set of the enhanced dedicated channel of the subordinate carrier under the non-service node B3.

Embodiment III

Figure 5:
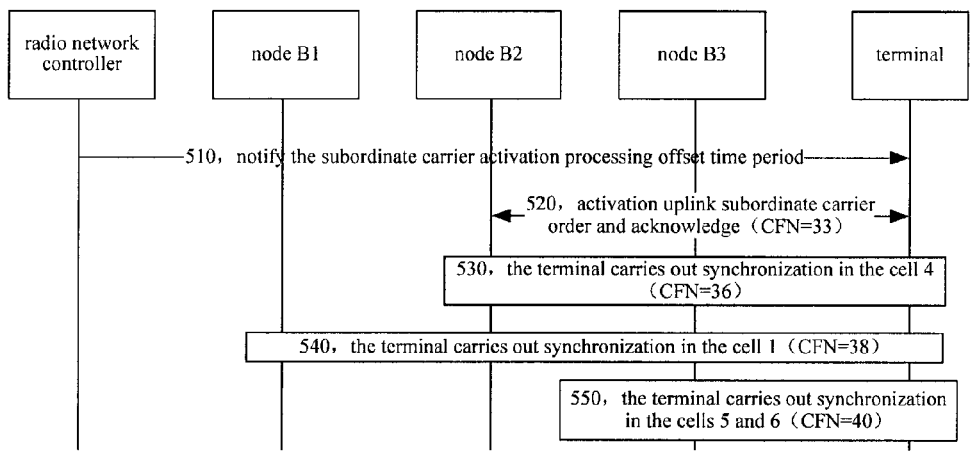
FIG. 5 is a schematic diagram of the processing procedure according to embodiment III of the present invention.

FIG. 5 is a schematic diagram of the processing procedure according to embodiment III of the present invention. As shown in FIG. 5, this embodiment provides a method for a terminal to carry out synchronization in individual cells of the activation set of the enhanced dedicated channel of the subordinate carrier during the subordinate carrier activation in the dual-carrier high-speed uplink packet access technology, that is, a method for a terminal to carry out synchronization in a cell of the activation set of the enhanced dedicated channel of the subordinate carrier under a non-service node B at the time point after the delay of the subordinate carrier activation processing offset time period.

In this case, the mode of the terminal obtaining the subordinate carrier activation processing offset time period in advance is: it is notified by the RNC when establishing or reconfiguring or adding a dual-carrier high-speed uplink packet access resource; and different cells in the activation set of the enhanced dedicated channel of the subordinate carrier can have the different subordinate carrier activation processing offset time period. The current time is the time when the terminal receives an activation uplink subordinate carrier order from the service node B. The terminal takes the current time as the reference, and carries out synchronization in the cell of the activation set of the enhanced dedicated channel of the subordinate carrier under the service node B at the time point after the delay of the subordinate carrier activation processing offset time period.

Step 510: in advance, the terminal is notified by the RNC of the subordinate carrier activation processing offset time period when establishing or reconfiguring or adding a dual-carrier high-speed uplink packet access resource. The subordinate carrier activation processing offset time period is represented by the number of frame offsets. The subordinate carrier activation processing offset time period of the service node B2 is 3 frames, the subordinate carrier activation processing offset time period of the non-service node B1 is 5 frames, and the subordinate carrier activation processing offset time period of the non-service node B3 is 7 frames.

Step 520: the terminal receives an activation uplink subordinate carrier order from the service node B2, and the terminal confirms to the service node B2 that the order is received. In this case, the terminal receives the activation uplink subordinate carrier order from the service node B2 in the mode of a high-speed share control channel order (HS-SCCH ORDER). And, the terminal makes the confirmation to the service node B2 in the mode of the dedicated physical control channel of the high-speed downlink share channel (HS-DPCCH) carrying the confirmation information. The time that the terminal receives the uplink subordinate carrier order from the service node B2 is the current time which is represented by the connection frame number and in particular is 33 frames.

Step 530: at the current time, that is, the time point when the connection frame number is 33 frames, as to the time point after the subordinate carrier activation processing offset time period of the service node B2 is delayed for 3 frames, that is the time point (connection frame number+the number of frame offsets)mod 256=(33+3)mod 256=36, in other words, the time point when the connection frame number of the next coming connection frame number is 36, the terminal carries out synchronization in the cell 4 of the activation set of the enhanced dedicated channel of the subordinate carrier under the service node B2.

Step 540: at the current time, that is, the time point when the connection frame number is 33 frame, as to the time point after the subordinate carrier activation processing offset time period of the service node B1 is delayed for 5 frames, that is: the time point (connection frame number+the number of frame offsets)mod 256=(33+5)mod 256=38, in other words, the time point when the connection frame number of the next coming connection frame number is 38, the terminal carries out synchronization in the cell 1 of the activation set of the enhanced dedicated channel of the subordinate carrier under the service node B1.

Step 550: at the current time, that is, the time point when the connection frame number is 33 frame, as to the time point after the subordinate carrier activation processing offset time period of the service node B3 is delayed for 7 frames, that is the time point (connection frame number+the number of frame offsets)mod 256=(33+7)mod 256=40, in other words, the time point when the connection frame number of the next coming connection frame number is 40, the terminal carries out synchronization in the cells 5 and 6 of the activation set of the enhanced dedicated channel of the subordinate carrier under the service node B3.

Embodiment IV

Figure 6:
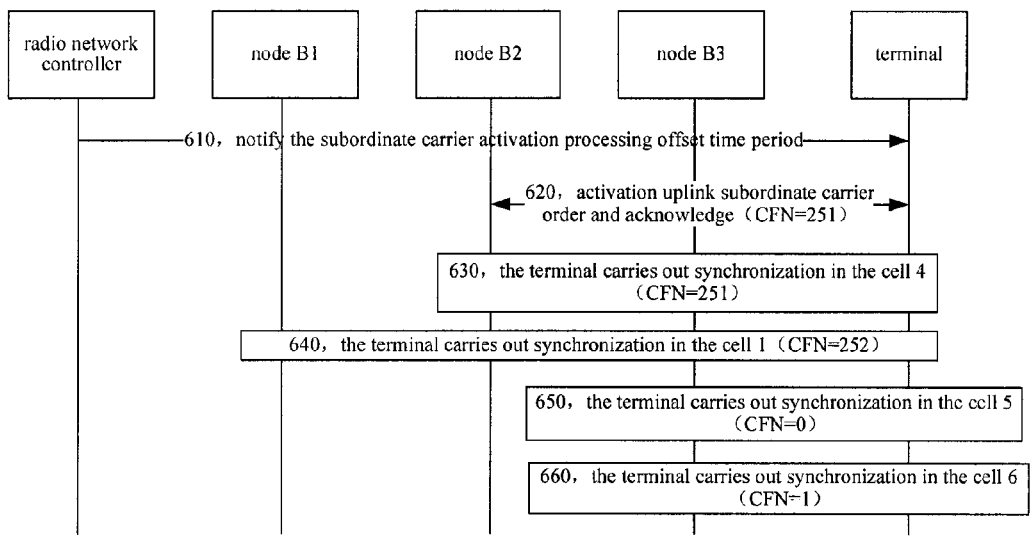
FIG. 6 is a schematic diagram of the processing procedure according to embodiment IV of the present invention.

FIG. 6 is a schematic diagram of the processing procedure according to embodiment IV of the present invention. As shown in FIG. 6, this embodiment provides a method for a terminal to carry out synchronization in individual cells of the activation set of the enhanced dedicated channel of the subordinate carrier during the subordinate carrier activation in the dual-carrier high-speed uplink packet access technology, that is, a method for a terminal to carry out synchronization in a cell of the activation set of the enhanced dedicated channel of subordinate carrier under a non-service node B at the time point after the delay of the subordinate carrier activation processing offset time period.

In this case, the mode of the terminal obtaining the subordinate carrier activation processing offset time period in advance is: it is notified by the RNC via a system message; and different nodes B have the same subordinate carrier activation processing offset time period. The current time is the time when the terminal confirms to the service node B that the order is received. The terminal takes the current time as the time point, and carries out synchronization in a cell in the activation set of the enhanced dedicated channel of the subordinate carrier under the service node B.

Step 610: in advance, the terminal is notified by the RNC of the subordinate carrier activation processing offset time period via a system message. The subordinate carrier activation processing offset time period is represented by the number of frame offsets, and the subordinate carrier activation processing offset time period of the cell 1 in the activation set of the enhanced dedicated channel of the subordinate carrier under the non-service node B1 is 1 frame. The subordinate carrier activation processing offset time period of the cell 5 in the activation set of the enhanced dedicated channel of the subordinate carrier under the non-service node B3 is 5 frames. The subordinate carrier activation processing offset time period of the cell 6 in the activation set of the enhanced dedicated channel of the subordinate carrier under the non-service node B3 is 6 frames.

Step 620: the terminal receives an activation uplink subordinate carrier order from the service node B2, and the terminal confirms to the service node B2 that the order is received. In this case, the terminal receives the activation uplink subordinate carrier order from the service node B2 in the mode of a high-speed share control channel order (HS-SCCH ORDER). And, the terminal makes the confirmation to the service node B2 in the mode of the dedicated physical control channel of the high-speed downlink share channel (HS-DPCCH) carrying the confirmation information. The time when the terminal confirms to the service node B that the order is received is taken as the current time, which is represented by the connection frame number and in particular is 251 frames.

Step 630: at the current time, that is, the time point when the connection frame number is 251 frame, the terminal carries out synchronization in the cell 4 of the activation set of the enhanced dedicated channel of the subordinate carrier under the service node B2.

Step 640: at the current time, that is, the time point when the connection frame number is 251 frame, as to the time point after the subordinate carrier activation processing offset time period of the cell 1 is delayed for 1 frame, that is: the time point (connection frame number+the number of frame offsets)mod 256=(251+1)mod 256=252, in other words, the time point when the connection frame number of the next coming connection frame number is 252, the terminal carries out synchronization in the cell 1 of the activation set of the enhanced dedicated channel of the subordinate carrier under the non-service node B1.

Step 650: at the current time, that is, the time point when the connection frame number is 251 frame, as to the time point after the subordinate carrier activation processing offset time period of the cell 5 is delayed for 5 frames, that is: the time point (connection frame number+the number of frame offsets)mod 256=(251+5)mod 256=0, in other words, the time point when the connection frame number of the next coming connection frame number is 0, the terminal carries out synchronization in the cell 5 of the activation set of the enhanced dedicated channel of the subordinate carrier under the non-service node B3.

Step 660: at the current time, that is, the time point when the connection frame number is 251 frame, as to the time point after the subordinate carrier activation processing offset time period of the cell 6 is delayed for 6 frame, that is: the time point (connection frame number+the number of frame offsets)mod 256=(251+6)mod 256=1, in other words, the time point when the connection frame number of the next coming connection frame number is 1, the terminal carries out synchronization in the cell 6 of the activation set of the enhanced dedicated channel of the subordinate carrier under the non-service node B3.

Apparatus Embodiments

Figure 7:
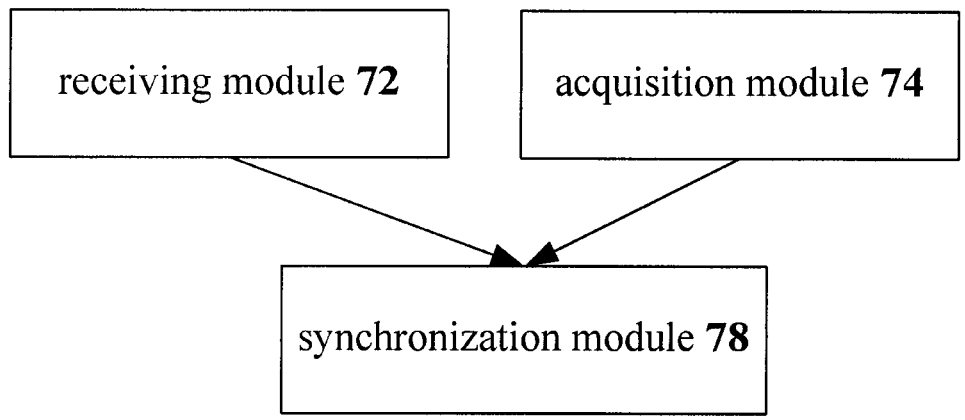
FIG. 7 is a structural block diagram of a terminal according to the embodiments of the present invention.

A terminal is provided in the embodiments, and FIG. 7 is a structural block diagram of the terminal according to the embodiments of the present invention, and as shown in FIG. 7, the apparatus comprises: a receiving module 72, an acquisition module 74, and a synchronization module 78, which structures will be described hereinafter.

The receiving module 72 is adapted to receive an activation uplink subordinate carrier order from a service node B; the acquisition module 74 is adapted to acquire a subordinate carrier activation processing offset time period; and the synchronization module 78, connected to the receiving module 72 and acquisition module 74, is adapted to take the current time as reference and carry out synchronization in a cell in an activation set of the enhanced dedicated channel of the subordinate carrier under a service node B at the first time point after having carried out delay according to the acquired subordinate carrier activation processing offset time period.

Figure 8:
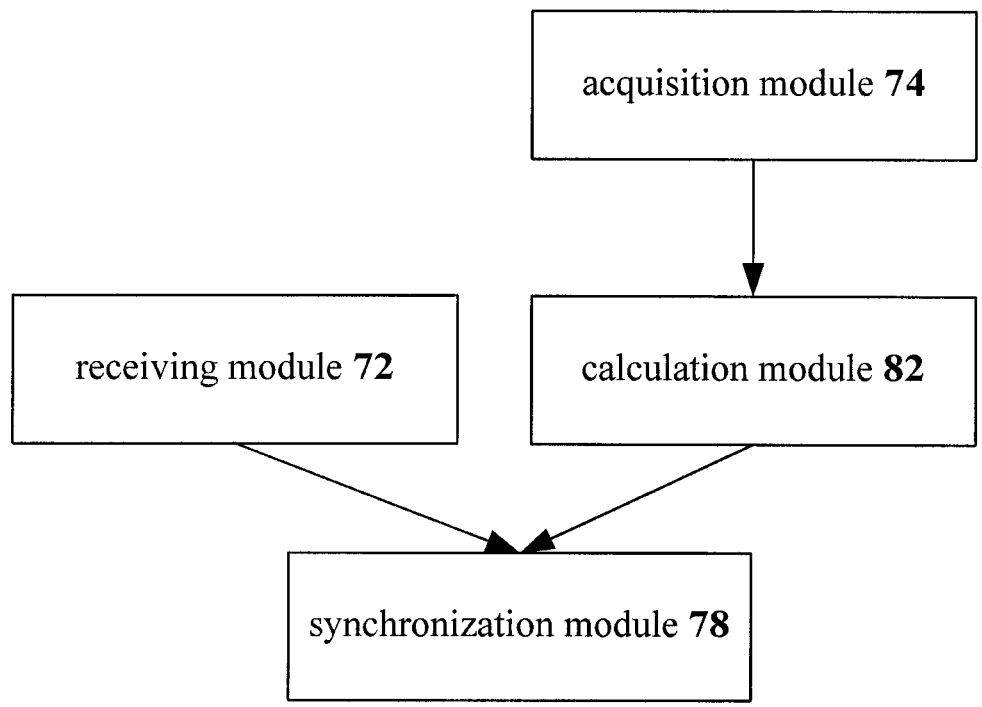
FIG. 8 is a preferred structural block diagram of the terminal according to the embodiments of the present invention.

FIG. 8 is a preferred structural block diagram of the terminal according to the embodiments of the present invention, and as shown in FIG. 8, the terminal also comprises: a calculation module 82 adapted to calculate the first time point according to the formula: the first time point=(connection frame number+the number of frame offsets)mod 256, wherein the connection frame number indicates the current time, the number of frame offsets indicates the subordinate carrier activation processing offset time period, and mod indicates the complementation operation.

In this case, the mode of the terminal obtaining the subordinate carrier activation processing offset time period in advance can be: it is notified by an RNC via a system message, or it can also be notified by the RNC when establishing or reconfiguring or adding a dual-carrier high-speed uplink packet access resource.

After having received the activation uplink subordinate carrier order from the service node B via a high-speed share control channel order and received the activation uplink subordinate carrier order, the terminal sends to the service node a confirmation message responding to the activation uplink subordinate carrier order via a dedicated physical control channel of the high-speed downlink share channel.

The terminal can also carry out synchronization in the cell of the activation set of the enhanced dedicated channel of the subordinate carrier under the service node B. For example, the terminal can take the current time as the second time point, and carries out synchronization in the cell of the activation set of the enhanced dedicated channel of the subordinate carrier under the service node B. Alternatively, the terminal can also take the current time as the reference, and carries out synchronization in the cell of the activation set of the enhanced dedicated channel of the subordinate carrier under the service node B at the first time point after having carried out delaying according to the acquired subordinate carrier activation processing offset time period.

There are two methods for acquiring the above current time, but it is not limited to these two methods.

The first method: the current time is the time when the terminal receives an uplink subordinate carrier order; and the second method: the current time is the time when the terminal confirms to the service node that the uplink subordinate carrier order is received.

In summary, by way of the above embodiments, the problem that the non-service node B and the terminal will need bigger search windows to detect the synchronization can be solved. In the above embodiments, the synchronous mode replaces the asynchronous mode to carry out cell synchronization of terminals, so that the time delay required by synchronization is reduced, the inter-cell interference brought about during this is reduced, and the cell capacity and coverage will be unaffected.

Apparently, those skilled in the art should understand that the above-mentioned modules and steps of the present invention can be realized by using general purpose calculating device, can be integrated in one calculating device or distributed on a network which consists of a plurality of calculating devices. And alternatively, they can be realized by using the executable program code of the calculating device, so that consequently they can be stored in the storing device and executed by the calculating device, or they are made into integrated circuit module respectively, or a plurality of modules or steps thereof are made into one integrated circuit module. In this way, the present invention is not limited to any particular combination of hardware and software.

Above description is only to illustrate the preferred embodiments but not to limit the present invention. Various alterations and changes to the present invention are apparent to those skilled in the art. The scope defined in claims shall comprise any modification, equivalent substitution and improvement within the spirit and principle of the present invention.

What is claimed is:

1. A method for synchronizing a subordinate carrier cell, comprising:
after a terminal receives an activation uplink subordinate carrier order from a service node B, the terminal, with the current time as a reference, carrying out synchronization in a cell in an activation set of the enhanced dedicated channel of the subordinate carrier under a non-service node B, at a first time point after having carried out delay according to an acquired subordinate carrier activation processing offset time period, wherein the first time point is calculated according to the formula of: the first time point=(a connection frame number+the number of frame offsets) mod 256, wherein the connection frame number indicates the current time, the number of frame offsets indicates the subordinate carrier activation processing offset time period, and mod indicates a complementation operation.

2. The method according to claim 1, wherein the terminal acquiring the subordinate carrier activation processing offset time period comprises: the terminal receiving a system message from an RNC, wherein the system message carries the subordinate carrier activation processing offset time period; or when establishing, reconfiguring or adding a dual-carrier high-speed uplink packet access receiving resource, the terminal receiving the subordinate carrier activation processing offset time period from the RNC.

3. The method according to claim 1, wherein after having received the activation uplink subordinate carrier order from the service node B via a high-speed share control channel order and received the activation uplink subordinate carrier order, the terminal sends to the service node a confirmation message responding to the activation uplink subordinate carrier order via a dedicated physical control channel of a high-speed downlink share channel.

4. The method according to claim 1, further comprising: the terminal, with the current time as a second time point, carrying out synchronization in a cell in an activation set of the enhanced dedicated channel of the subordinate carrier under the service node B.

5. The method according to claim 1, further comprising: the terminal, with the current time as the reference, carrying out synchronization in a cell in an activation set of the enhanced dedicated channel of the subordinate carrier under the service node B at the first time point after having carried out delay according to the acquired subordinate carrier activation processing offset time period.

6. The method according to claim 1, wherein said current time is: the time when the terminal receives the uplink subordinate carrier order.

7. The method according to claim 1, wherein said current time is: the time when the terminal confirms to the service node that the uplink subordinate carrier order is received.

8. A terminal, comprising:
a memory;
a processor;
a receiving module configured to receive an activation uplink subordinate carrier order from a service node B;
an acquisition module configured to acquire a subordinate carrier activation processing offset time period;
a synchronization module configured to carry out, with the current time as a reference, synchronization in a cell in an activation set of the enhanced dedicated channel of the subordinate carrier under a non-service node B at the first time point after having carried out delay according to the acquired subordinate carrier activation processing offset time period; and
a calculation module configured to calculate the first time point according to the formula of: the first time point=(a connection frame number+the number of frame offsets) mod 256, wherein the connection frame number indicates the current time, the number of frame offsets indicates the subordinate carrier activation processing offset time period, and mod indicates a complementation operation.

9. The method according to claim 1, wherein said current time is: the time when the terminal receives the uplink subordinate carrier order.

10. The method according to claim 2, wherein said current time is: the time when the terminal receives the uplink subordinate carrier order.

11. The method according to claim 3, wherein said current time is: the time when the terminal receives the uplink subordinate carrier order.

12. The method according to claim 4, wherein said current time is: the time when the terminal receives the uplink subordinate carrier order.

13. The method according to claim 5, wherein said current time is: the time when the terminal receives the uplink subordinate carrier order.

14. The method according to claim 1, wherein said current time is: the time when the terminal confirms to the service node that the uplink subordinate carrier order is received.

15. The method according to claim 2, wherein said current time is: the time when the terminal confirms to the service node that the uplink subordinate carrier order is received.

16. The method according to claim 3, wherein said current time is: the time when the terminal confirms to the service node that the uplink subordinate carrier order is received.

17. The method according to claim 4, wherein said current time is: the time when the terminal confirms to the service node that the uplink subordinate carrier order is received.

18. The method according to claim 5, wherein said current time is: the time when the terminal confirms to the service node that the uplink subordinate carrier order is received.

* * * * *